Patented Feb. 21, 1933

1,898,879

UNITED STATES PATENT OFFICE

EDUARD KRUMMENACHER, OF RIEHEN, NEAR BASEL, SWITZERLAND, ASSIGNOR TO THE FIRM OF SOCIETY OF CHEMICAL INDUSTRY IN BASLE, OF BASEL, SWITZERLAND

PROCESS FOR THE MANUFACTURE OF CHLOROSULPHONIC ACID

No Drawing. Application filed August 1, 1932, Serial No. 627,224, and in Switzerland and Germany August 17, 1931.

It has been found that chlorosulphonic acid can be made in a very simple manner by causing to act on a solution of approximately 2 moles $SO_3$ in approximately 1 mole $H_2SO_4$ approximately 1 equivalent weight of a metal chloride, or by causing to act on a solution of approximately 3 moles $SO_3$ in approximately 1 mole $H_2SO_4$ approximately 2 equivalent weights of a metal chloride, and separating the formed chlorosulphonic acid from the reaction mixture.

Particularly good results with regard to making the most of the components used for this reaction, as well as with regard to the yield and purity of the produced chlorosulphonic acid are obtained if a solution of 2 moles $SO_3$ in 1 mole $H_2SO_4$ and 1 equivalent weight of a metal chloride, or a solution of 3 moles $SO_3$ in 1 mole $H_2SO_4$ and 2 equivalent weights of a metal chloride are used.

The most various metal chlorides come into consideration for carrying out the present invention, such as, for example, the alkali chlorides, such as sodium chloride and potassium chloride, further magnesium chloride, ferric chloride, barium chloride, calcium chloride or aluminium chloride. Particularly advantageous is the use of the cheap sodium chloride.

The conversion, which in the present invention is for example effected by employing sodium chloride, proceeds mainly in accordance with the following equations:—

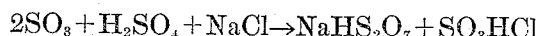
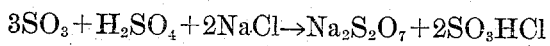

$$2SO_3 + H_2SO_4 + NaCl \rightarrow NaHS_2O_7 + SO_3HCl$$
$$3SO_3 + H_2SO_4 + 2NaCl \rightarrow Na_2S_2O_7 + 2SO_3HCl$$

From these equations it follows that a particularly large quantity of chlorosulphonic acid is obtained with respect to the quantity of the starting materials used if a solution of 3 moles $SO_3$ in 1 mole $H_2SO_4$ and 2 equivalent weights of the metal chloride are used.

The separation of the chlorosulphonic acid obtainable according to the present invention may be effected in various manners, such as, for example, by suction or by distillation.

The following examples illustrate the invention the parts being by weight:—

Example 1

120 parts of dry, finely ground sodium chloride are introduced cautiously, whilst stirring, into 340 parts of oleum having a content of $SO_3$ of 70 per cent in a reflux apparatus, care being taken that neither hydrogen chloride nor sulphur trioxide escapes from the reflux condenser. During the introduction of the sodium chloride the temperature rises to about 150° C. (boiling point of chlorosulphonic acid) owing to the heat liberated by the reaction. This temperature is maintained for some time after the salt has been introduced and the chlorosulphonic acid is finally distilled from the pasty mass which has formed.

Example 2

60 parts of dry, finely ground sodium chloride are introduced cautiously whilst stirring, into 260 parts of oleum having a content of $SO_3$ of 62 per cent in a reflux apparatus, care being taken that neither hydrogen chloride nor sulphur trioxide escapes from the reflux condenser. After the salt has been introduced, the reaction mass is maintained for some time at a temperature of about 150° C. and the chlorosulphonic acid is then separated from it by distillation.

What I claim is:—

1. Process for the manufacture of chlorosulphonic acid, consisting in causing to act on a solution of approximately 2 moles $SO_3$ in approximately 1 mole $H_2SO_4$ approximately 1 equivalent weight of a metal chloride, or by causing to act on a solution of approximately 3 moles $SO_3$ in approximately 1 mole $H_2SO_4$ approximately 2 equivalent weights of a metal chloride, and separating the formed chlorosulphonic acid from the reaction mixture.

2. Process for the manufacture of chlorosulphonic acid, consisting in causing to act on a solution of 2 moles $SO_3$ in 1 mole $H_2SO_4$ 1 equivalent weight of a metal chloride, or by causing to act on a solution of 3 moles $SO_3$ in 1 mole $H_2SO_4$ 2 equivalent weights of a metal chloride, and separating the formed chlorosulphonic acid from the reaction mixture.

3. Process for the manufacture of chlorosulphonic acid, consisting in causing to act on a solution of 3 moles $SO_3$ in 1 mole $H_2SO_4$ 2 equivalent weights of a metal chloride, and separating the formed chlorosulphonic acid from the reaction mixture.

4. Process for the manufacture of chlorosulphonic acid, consisting in causing to act on a solution of 3 moles $SO_3$ in 1 mole $H_2SO_4$ 2 equivalent weights of an alkali chloride, and separating the formed chlorosulphonic acid from the reaction mixture.

5. Process for the manufacture of chlorosulphonic acid, consisting in causing to act on a solution of 3 moles $SO_3$ in 1 mole $H_2SO_4$ 2 equivalent weights of an alkali chloride, and separating the formed chlorosulphonic acid from the reaction mixture by distillation.

6. Process for the manufacture of chlorosulphonic acid, consisting in causing to act on a solution of 3 moles $SO_3$ in 1 mole $H_2SO_4$ 2 equivalent weights of sodium chloride, and separating the formed chlorosulphonic acid from the reaction mixture by distillation.

In witness whereof I have hereunto signed my name this 20th day of July, 1932.

EDUARD KRUMMENACHER.